United States Patent [19]

Church et al.

[11] 4,307,164

[45] Dec. 22, 1981

[54] RECHARGEABLE ELECTRICAL STORAGE BATTERY WITH ZINC ANODE AND AQUEOUS ALKALINE ELECTROLYTE

[75] Inventors: Peter K. Church, Cascade; Alan G. Phillips, Arvada, both of Colo.

[73] Assignee: El-Chem Corporation, Colorado Springs, Colo.

[21] Appl. No.: 100,845

[22] Filed: Dec. 6, 1979

Related U.S. Application Data

[62] Division of Ser. No. 927,927, Jul. 25, 1978, Pat. No. 4,207,391.

[51] Int. Cl.³ .............................................. H01M 6/04
[52] U.S. Cl. .................................... 429/207; 429/229
[58] Field of Search ................ 429/206, 207, 229–231

[56] References Cited

U.S. PATENT DOCUMENTS

| | | | |
|---|---|---|---|
| 3,451,851 | 6/1969 | Stanimirovitch | 429/229 X |
| 3,520,729 | 7/1970 | Voss et al. | 429/229 X |
| 3,600,231 | 8/1971 | Dawson | 429/229 X |
| 3,623,911 | 11/1971 | Oswin | 429/229 X |
| 3,672,996 | 6/1972 | Louzos | 429/207 |
| 3,930,883 | 1/1976 | Kandler | 429/229 X |
| 4,091,178 | 5/1978 | Kordesch | 429/230 X |

*Primary Examiner*—Charles F. LeFevour
*Attorney, Agent, or Firm*—Max L. Wymore

[57] ABSTRACT

A battery system having a zinc containing anode in an alkaline electrolyte produced in a manner to substantially avoid dendritic growth and anode shape change with additives added to the electrolyte and/or anode to assist therein.

23 Claims, 3 Drawing Figures

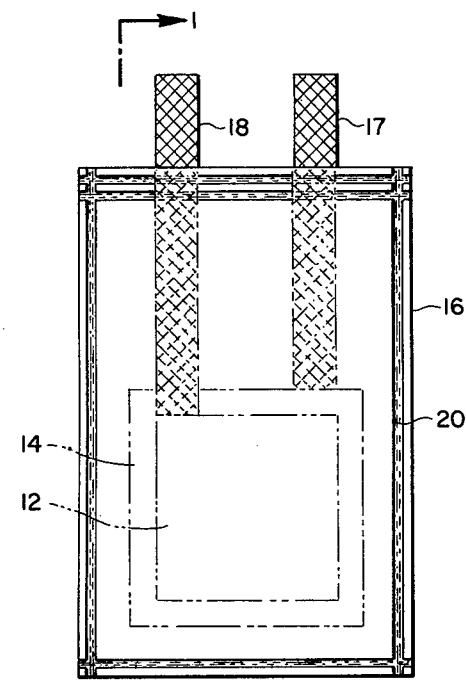
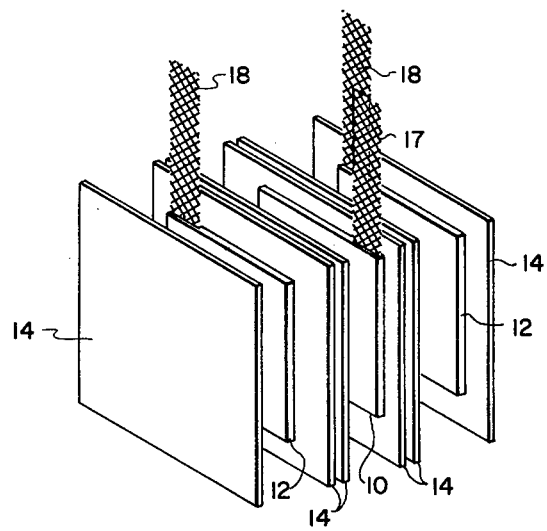
Fig. 2    Fig. 1
Fig. 3

RECHARGEABLE ELECTRICAL STORAGE BATTERY WITH ZINC ANODE AND AQUEOUS ALKALINE ELECTROLYTE

This is a division of application Ser. No. 927,927, filed July 25, 1978 now U.S. Pat. No. 4,207,391.

BACKGROUND

This invention is directed to an improved use of zinc in rechargeable electrical storage batteries incorporating an aqueous alkaline electrolyte and wherein the zinc is used as the negative electrode, i.e. anode. Typical positive electrodes (cathodes) used in conjunction with these zinc anodes include nickel oxide, AgO, $Ag_2O$, $MnO_2$, HgO, $PbO_2$ and the like.

The use of zinc electrodes in rechargeable batteries has long been recognized as a means of obtaining high energy density and high battery voltage compared to less electronegative anode materials such as cadmium, iron or lead. Zinc also had the advantage of being relatively light in weight, relatively abundant and relatively low in cost.

As is well known to those involved in the field, zinc electrodes where used in an alkaline electrolyte battery, have a habit of forming dendrites or "trees" during repeated charge/discharge cycling. This significantly shortens the useful cell life. If left unchecked, these dendrites or tree-like crystalline zinc growths will quickly bridge across to the positive electrode, usually causing battery shorting in a very few use cycles.

Associated with the dendrite problem at the anode is the so-called shape change phenomenon. This is a shifting of the zinc on the anode current collector that can cause a serious reduction in battery efficiency. The dendrite and shape change effects are considered by many to be closely interrelated, and are thought to be linked to the solubility of zinc in the alkaline electrolyte solution.

Cell shorting by dendrite growth can be slowed down by the inclusion of microporous membranes as part of the separator system used between the elctrodes. Other techniques such as intermediate electrodes that oxidize the dendrites on contact and electrolyte additives that act to prevent zinc from going into solution have been disclosed. Specially shaped anodes have been found helpful in some cell configurations for reducing shape change. While cycle life can sometimes be increased by these and other methods, this is invariably accomplished at the expense of some other factor. Perhaps primary among these are increased internal cell resistance, increased battery size and weight and increased battery cost. Special electrical charging systems have been reported to slow dendrite growth or change their crystalline form.

None of the approaches reported to date, when used singly or in combination with each other, seems to have adequately solved the zinc anode problem for long cycle life rechargeable storage batteries. A viable solution to this problem is currently being sought by many investigators. The closest prior art U.S. Patents of which applicant is aware are as follows: Nos.
3,617,384
3,672,996
3,785,868
3,970,472

SUMMARY OF THE INVENTION

The present invention is based on what is believed to be a new principle for preventing or greatly minimizing dendrite growth and shape change at the zinc anode of aqueous alkaline electrolyte rechargeable cells. All testing to date has been carried out in cells without the use of microporous membranes of any kind. Separation has been entirely accomplished by means of highly porous non-woven nylon or viscose material.

The new approach consists of a special anode configuration where the zinc is present in a microcrystalline or colloidal state incorporated in a conductive oxidized zinc matrix. This is accomplished by electrochemically converting a finely divided metallic zinc anode to a highly oxidized form in the presence of an alkaline electrolyte. Subsequent charging of the anode will cause the formation of the required amount of interstitial zinc. These electrochemical oxidation and reduction processes may be conveniently carried out within the actual cell in which the anode is to be used.

The invention also includes the use of selected inorganic additions incorporated in the electrolyte and/or anodes. These additives consist of certain manganese, tin and related compounds. When employed with the electrochemically converted anodes, their use has resulted in dendrite free cells with minimal shape change. Comparison cells, using more conventional zinc anodes and electrolyte systems, have shown rapid failure due to severe dendrite growth and associated shape change in the same number of charge/discharge cycles using the same test conditions.

The fact that microporous membranes are not required in the practice of this invention has been found to result in low internal cell resistance. This results in a highly efficient charge to discharge relationship, and increased energy density.

DESCRIPTION OF THE INVENTION

FIGS. 1 and 2 show a test cell according to the invention with FIG. 1 being a cross sectional view along line 1-1 of FIG. 2; and, FIG. 3 is an exploded view of the test cell of FIGS. 1 and 2 less the plastic envelope.

The special anode of this invention consists of an electrochemically oxidized anode that initially was substantially composed of finely divided metallic zinc particles bonded to a suitable current collector. The metallic zinc employed in the initial anode may be zinc dust, zinc powder or other forms of finely divided zinc. A nominal 6 micron zinc dust has been employed in most of the testing described in this disclosure, but zinc powders ranging in size from 5 microns to −325 mesh, and even −100 mesh, have been used successfully.

In constructing the anode, the zinc dust or powder has typically been made into a thick slurry using a binder consisting of a premixed water and methylcellulose mixture. Mercuric oxide or some other mercury compound is also normally included in the mixture to increase the hydrogen overvoltage of the zinc according to well-known practice. A basic zinc slurry formulation can be seen by referring to anode type I in Table 1.

The zinc slurry formulations shown in this table have been designed for application to the current collector by means of a so-called "pasting jig". In use, a suitable current collector such as a metal foil, metal screen or expanded metal sheet is placed in the bottom of an appropriately shaped recessed area in the jig. The slurry is then troweled into and across the cavity containing the collector, providing a uniform thickness zinc anode.

When using expanded metal or open mesh screen as the current collector, a piece of absorbent material, such as high rag content paper, is first placed in the recess of the "pasting jig" to prevent the slurry from penetrating the collector and sticking to the jig surface. After the slurry has been applied to the collector, the still wet anode is removed from the jig and allowed to dry. The bond between zinc and current collector will be sufficiently strong at this point for normal handling procedures. Any flashing, or excess material at the edges of the current collector or on the current collector tab can be easily removed in this dry condition.

While a methylcellulose-water mixture has been used as the binder in the formulations of Table 1, other binders appear to be useful such as a variety of sodium carboxy methylcellulose compositions, polyvinyl alcohol, Teflon and even small amounts of KOH. Again, while the solvent has normally been water, other solvents may be employed with or without water, depending on the specific binders involved, the drying times desired or the anode additives used.

Other methods of fabricating the zinc anodes have been successfully used such as dipping the current collector into a suitably thinned slurry, or painting or flowing the slurry onto the collector. Methods of this type may well be preferable for production quantities, but the pasting technique was found to be the most expeditious when preparing small numbers of anodes from a limited amount of slurry.

Anode construction of this type is not new, having previously been used by others. For example, Devitt in U.S. Pat. No. 3,785,868 describes anodes of this basis form. Numerous other methods for preparing zinc anodes of usable form have also been described in prior literature.

Current collectors used in this development have included nickel and copper as well as tin, silver and gold plated nickel. All of these have given excellent results with repeated cycling. The nickel would probably be avoided in commercial cells because of cost and, in the unplated condition, also because of its known property of reducing the hydrogen overvoltage of zinc. This could reduce battery open circuit life on long term standing. The least expensive current collector for production use would most likely be copper or tin plated iron or steel.

The metallic zinc anodes of the type just described can now be used to form the novel anode of this invention. This involves a special electrochemical anode oxidation step with the metallic zinc anode immersed in an aqueous alkaline electrolyte solution.

TABLE 1

SELECTED ZINC ANODE SLURRY COMPOSITIONS SUITABLE FOR USE IN PASTING JIG

| FORMULATION # | COMPOSITION[h] | AMOUNT (grams) | PERCENT[a] ADDITIVE |
|---|---|---|---|
| I | Zinc dust[b] | 24.38 | 97.5 |
|  | Hgo[d] | 0.63 | 2.5 |
|  | Methylcellulose-H$_2$O binder[c] | 4.60 |  |
| AS | Zinc dust | 23.90 | 95.5 |
|  | Hgo | 0.63 | 2.5 |
|  | Cu-400 mesh | 0.50 | 2.0 |
|  | Methylcellulose-H$_2$O binder | 4.60 |  |
| BA | Zinc dust | 23.90 | 95.5 |
|  | Hgo | 0.63 | 2.5 |
|  | Pb,-325 mesh | 0.50 | 2.0 |
|  | Methylcellulose-H$_2$O binder | 4.60 |  |
| BB | Zinc dust | 22.90 | 91.5 |
|  | Hgo | 0.63 | 2.5 |
|  | Pb,-325 mesh | 1.50 | 6.0 |
|  | Methylcellulose-H$_2$O binder | 4.60 |  |
| EF | Zinc dust | 23.40 | 93.5 |
|  | Hgo | 0.63 | 2.5 |
|  | SnO$_2$[e] | 1.00 | 4.0 |
|  | Methylcellulose-H$_2$O binder | 4.60 |  |
| EG | Zinc dust | 23.90 | 95.5 |
|  | Hgo | 0.63 | 2.5 |
|  | SnO$_2$ | 0.50 | 2.0 |
|  | Methylcellulose-H$_2$O binder | 4.60 |  |
| EK | Zinc dust | 24.15 | 96.5 |
|  | Hgo | 0.63 | 2.5 |
|  | Sn,-325 mesh | 0.25 | 1.0 |
|  | Methylcellulose-H$_2$O binder | 4.60 |  |
| EJ | Zinc dust | 23.90 | 95.5 |
|  | Hgo | 0.63 | 2.5 |
|  | Sn,-325 mesh | 0.50 | 2.0 |
|  | Methylcellulose-H$_2$O binder | 4.60 |  |
| EW | Zinc dust | 23.90 | 95.5 |
|  | Hgo | 0.63 | 2.5 |
|  | ZnSnO$_3$ . 4H$_2$O[f] | 0.50 | 2.0 |
|  | Methylcellulose-H$_2$O binder | 4.60 |  |
| EX | Zinc dust | 23.65 | 94.5 |
|  | Hgo | 0.63 | 2.5 |
|  | ZnSnO$_3$ . 4H$_2$O | 0.75 | 3.0 |
|  | Methylcellulose-H$_2$O binder | 4.60 |  |
| FA | Zinc dust | 24.4 | 95.5 |
|  | Hgo | 0.63 | 2.5 |
|  | K$_2$SnO$_3$ . 3H$_2$O[g] | 0.5 | 2.0 |
|  | Methylcellulose-H$_2$O binder | 4.6 |  |
|  | Zinc dust | 24.40 | 93.7 |

TABLE 1-continued
SELECTED ZINC ANODE SLURRY COMPOSITIONS SUITABLE FOR USE IN PASTING JIG

| FORMULATION # | COMPOSITION[h] | AMOUNT (grams) | PERCENT[a] ADDITIVE |
|---|---|---|---|
| FB | Hgo | 0.63 | 2.4 |
| | $ZnSnO_3 \cdot 4H_2O$ | 0.50 | 1.9 |
| | $K_2SnO_3 \cdot 3H_2O$ | 0.50 | 1.9 |
| | Methylcellulose-$H_2O$ binder | 4.60 | |

NOTES

[a] Percentages do not include methycellulose-$H_2O$ binder as an insignificant weight remains after the water evaporation

[b] Asarco type 111 zinc dust, -6 micron particle size, manufactured by Asarco Corporation, So. Plainfield, N.J.

[c] METHOCEL, type A4M methylcellulose, 4000 cps viscosity, manufactured by The Dow Chemical Company, Midland, Michigan

[d] Mercuric oxide, yellow form, fine powder

[e] Stannic oxide, fine powder

[f] Zinc stannate, chemically precipitated from zinc nitrate, potassium stannate reaction, washed and dried

[g] 95% potassium stannate

[h] The slurry composition ingredients have been extremely well mixed to assure uniform particulate dispersion. The procedure involves premixing the HgO powder with the methylcellulose-$H_2O$ gelled binder, then adding and mixing any of the special anode additives. The final step is to add the zinc dust. Thorough mixing is done at each of these steps.

During this process a high degree of oxidation of the zinc occurs and the anode undergoes a considerable expansion. Electrochemically converted anodes of this type have been found to provide greatly reduced dendrite growth and shape change as compared to cells using more conventional zinc anodes.

Assuming a nickel-zinc cell as an example, an expedient manner of carrying out the initial electrochemical oxidation step is simply to start with a completely assembled cell. The cell would include the metallic zinc anode, separator and cathode. An electrolyte, such as 30%–40% KOH solution saturated or nearly saturated with zincate is then added to the cell. If the nickel cathode has been installed in its discharged condition, the electrochemical oxidation of the anode can now be accomplished by simply shorting the electrode terminals. Hydrogen gas will start to evolve almost immediately from the nickel cathode. This will continue until the zinc at the anode reaches a highly oxidized state.

With the shorting method just described, it has been found that the majority of the nickel-zinc cells discussed in this application will have reached a highly oxidized anode condition in a period of 16 to 24 hours. At this point, it will be observed that the gassing in the cells will have essentially stopped. Microscopic examination shows an expanded and very white anode material which includes electrolyte. No visual evidence of the original zinc can be found, indicating a high degree of conversion to the oxidized form.

Chemical analysis of such cell anodes have confirmed these visual observations. For example, typical anodes removed from a cell after a 22 hour shorting period were found to contain about 96% in an oxidized zinc form with only about 4% remaining as zinc.

The anode can also be converted to a suitably oxidized state over shorter or longer time periods by using resistive loads, charged cathodes, constant current discharging and the like. Care should be taken, however, not to overheat the electrodes as this can cause warping of the cathode or non-uniformity at the anode.

The time required for the gassing to reach a minimal state during the discharging cycle will depend on the amount of zinc used in the initial anode, on the discharge rate and also on the temperature. Because of this latter variable and for consistency of test results, an ambient temperature of about 80° F. has been used for the special anode processing in most of the examples in this disclosure.

The final anode preparation step occurs during the subsequent and normal electrical charge cycle when a portion of the electrochemically oxidized anode material is converted to extremely finely divided zinc. The presence of the zinc can now be observed as a blue coloration of the anode, indicating highly dispersed zinc in the oxidized zinc lattice. The zinc cannot be seen in a visible aggregate form under normal microscopic observation and must be assumed to be microcrystalline or colloidal in nature. Chemical activity and an electrical output from the cell has confirmed its presence.

The reasons for the improved performance of anodes that have undergone this high degree of initial electrochemical oxidation prior to normal cell cylcing is not understood with any degree of certainty. Our conclusions, however, based both on observations and supposition, can be summarized as follows:

(1) The anode has a high degree of electrical conductivity, probably due to the inclusion of KOH from the electrolyte closely associated or chemically tied up with the oxidized zinc structure. This is evident by the excellent electrical characteristics of such cells, (2) Metallic zinc present in the highly reduced anode structure during or at the conclusion of a charge cycle, is in a uniformly distributed and finely divided form. This condition provides a very low current density at the individual zinc particles because of the extremely large surface area presented. Prior work by others has invariably shown that zinc dendrite reduction can be equated with increased surface area and current density reduction; and, (3) The shift of the active zinc material from a reduced to a more oxidized form and back again to a more reduced form during repeated cell cycling can most easily take place within the highly conductive oxide lattice structure of the anode. As a result there is believed to be little tendency for a mass transfer to occur between the cell electrolyte solution and the anode. Plating of zinc onto the anode from the zincate in the electrolyte of cells containing zinc anodes is thought by many investigators to be a major cause of dendrite growth and associated shape change problems.

While a highly oxidized anode condition prior to the initial charge cycle has been found to provide maximum dendrite prevention under severe cell operating conditions, even incompletely oxidized anodes have often shown marked improvement over comparison cells with no preliminary oxidation step.

The electrode separator materials used in the course of this development have included non-woven nylon and in earlier stages a similarly structured viscose material. Specifically, these have included types 2505-k4 and 2503-k4 nylon manufactured by the Pellon Corporation of Lowell, Massachusetts. The cellulose separator material was manufactured by Chicopee Manufacturing Company of Mill Town, New Jersey as their type S-950-CF Code 3674. The nylon separators are about 0.023 cm in thickness and the latter about 0.018 cm in thickness.

In most instances, three individual separators have been used between the zinc anode and the cathode. On cell disassembly, the multiple separators afford a convenient gauge for determining dendrite penetration. These separators have a high degree of porosity allowing the free flow of electrolyte between electrodes.

The electrolytes used in the test cells involved in this application have all been based on a potassium hydroxide system, both with and without zincate additive. Compositions of these basic electrolytes have been listed for reference purposes in Table 2. Sodium hydroxide, lithium hydroxide and the like have not been included as part of the electrolyte compositions during these evaluations, but their use is contemplated. These other hydroxides, as will be known to those familiar with the alkaline battery field, can often be advantageous for certain cell configurations.

Certain specific categories of inorganic electrolyte additives have been found, however, that further improve cell performance when used in conjunction with the electrochemically formed anode already described. These special additives form a part of this invention.

The initial group of such electrolyte additives involve the use of manganese compounds soluble in the alkali electrolyte solutions. Included in this group are potassium permanganate and zinc permanganate. Best results from a dendrite and shape change prevention standpoint have been obtained when these compounds have been added to electrolytes also containing zincate in solution. Typical electrolyte formulations containing these manganese additives are shown in Table 3.

While not readily available for purchase, the potassium and zinc manganates also work as replacements for the permanganates. This has been verified in several instances by successfully using potassium permanganate that had changed from purple to green color, indicating a reduction from the +7 to the +6 potassium manganate oxidation state.

TABLE 2

KOH ELECTROLYTES WITH
AND WITHOUT ZINCATE ADDITIONS

| ELECTROLYTE TYPE DESIGNATION | COMPOSITION | PERCENT | PERCENT Zn |
|---|---|---|---|
| 25K | KOH | 25 | 0 |
|  | $H_2O$ |  |  |
| 30K | KOH | 30 | 0 |
|  | $H_2O$ |  |  |
| 35K | KOH | 35 | 0 |
|  | $H_2O$ |  |  |
| 40K | KOH | 40 | 0 |
|  | $H_2O$ |  |  |
| 25K28 | KOH | 25.0 | 2.8 |
|  | ZnO[a] | 3.5 |  |
|  | $H_2O$ |  |  |
| 30K35 | KOH | 30.0 | 3.5 |
|  | ZnO | 4.3 |  |
|  | $H_2O$ |  |  |
| 35K41 | KOH | 35.0 | 4.1 |
|  | ZnO | 5.0 |  |
|  | $H_2O$ |  |  |
| 30K44 | KOH | 30.0 | 4.4 |
|  | ZnO | 5.4 |  |
|  | $H_2O$ |  |  |
| 30K74 | KOH | 30.0 | 7.4 |
|  | ZnO | 5.4 |  |
|  | $Zn(OH)_2$[b] | 3.1 |  |
|  | $H_2O$ |  |  |

NOTES
[a] Zinc oxide, dry process, chemical grade, Certified A.C.S.
[b] Zinc hydroxide, chemically precipitated, washed and dried.

TABLE 3

KOH ELECTROLYTES WITH
SOLUBLE MANGANESE ADDITIONS

| ELECTROLYTE TYPE DESIGNATION | COMPOSITION | PERCENT | PERCENT Zn | PERCENT Mn |
|---|---|---|---|---|
| D-3 | KOH | 30.0 | 0 | 0.58 |
|  | $KMnO_4$[c] | 1.7 |  |  |
|  | $H_2O$ |  |  |  |
| D-4/4 | KOH | 30.0 | 3.45 | 0.14 |
|  | ZnO[a] | 4.3 |  |  |
|  | $KMnO_4$ | 0.4 |  |  |
|  | $H_2O$ |  |  |  |
| D-4/2 | KOH | 30.0 | 3.40 | 0.28 |
|  | ZnO | 4.2 |  |  |
|  | $KMnO_4$ | 0.8 |  |  |
|  | $H_2O$ |  |  |  |
| D-4 | KOH | 30.0 | 3.40 | 0.56 |
|  | ZnO | 4.2 |  |  |
|  | $KMnO_4$ | 1.6 |  |  |
|  | $H_2O$ |  |  |  |
| D-8 | KOH | 30.0 | 4.43 | 0.55 |
|  | ZnO | 5.5 |  |  |
|  | $KMnO_4$ | 1.6 |  |  |
|  | $H_2O$ |  |  |  |
| D-8Z10 | KOH | 30.0 | 6.40 | 0.53 |
|  | ZnO | 5.4 |  |  |
|  | $Zn(OH)_2$[b] | 3.1 |  |  |
|  | $KMnO_4$ | 1.5 |  |  |
|  | $H_2O$ |  |  |  |
| D-2 | KOH | 25.0 | 2.43 | 0.56 |
|  | ZnO | 3.0 |  |  |
|  | $KMnO_4$ | 1.6 |  |  |
|  | $H_2O$ |  |  |  |

[a] Zinc oxide, dry process, chemical grade, certified A.C.S.
[b] Zinc hydroxide, chemically precipitated, washed and dried.
[c] Potassium permanganate, reagent grade.

Other permanganates (and manganates) such as sodium, lithium, calcium, etc., should also make viable candidates, but the introduction of new ion species into the electrolyte system should be taken into consideration.

When used in conjunction with the electrochemically oxidized anodes, as previously described, the inclusion of an alkali soluble manganese in the electrolyte has been found to significantly reduce and, in many instances, to completely eliminate zinc dendrite formation. Associated anode shape change is also noticeably minimized over that of equivalently constructed cells tested without the manganese present.

The manganese is normally introduced into the cell as part of the original electrolyte used during the initial electrochemical anode oxidation process of the invention. By the time the anode has reached its highly oxidized and expanded condition, the original purple or green color of the electrolyte has normally disappeared. This indicates that the manganese has been reduced to a lower oxidation state, such as the dioxide or hydroxide, and is now apparent only as a brownish discoloration at the anodes and separators and as a cloudy suspension in the electolyte.

In other tests, an excess of the alkali soluble manganese has been placed in the bottom of the cell to act as a reservoir of the high oxidation state material. While the purple electrolyte color remains in this case, excellent dendrite protection was still afforded during cell cycling. Excellent results have also been obtained by introducing the manganese at the beginning of the initial charge cycle or even waiting until the first normal discharge cycle.

It is not known in what manner the manganese is entering into the electrochemical system. There is a possibility of the formation of a manganese-zinc or manganese-zinc-potassium complex, since maximum dendrite prevention is not achieved unless ample zincate is also present in the electrolyte.

Equally perplexing is the mechanism by which dendrite prevention and associated shape change minimization is achieved. Our present theory is that the manganese, whether as a compound or complex, is in some way preventing or greatly reducing passivation at the zinc anode during discharge. That is, the manganese is inhibiting the formation of poorly conductive zinc oxides. This would leave the anode in a highly conductive state during the subsequent charge cycle, thereby enhancing a more uniform conversion of the oxidized zinc to the colloidal or microcrystalline metallic form within the oxide lattice. This same effect would, of course, also allow more uniform plating of zinc from the electrolyte should this occur.

The second group of electrolyte additives, considered to be a part of this invention, comprise the use of tin compounds soluble in the electrolyte solution. More specifically, the tin compounds found useful at this point included potassium stannate and zinc stannate. Representative electrolyte formulations containing these compounds are included in Table 4.

As in the case of the manganese electrolyte additives, these tin electrolyte additives are also used in conjunction with the special, highly electrochemically oxidized anodes already described. Their use has been found to noticeably reduce overall anode shape change, both during the special anode oxidizing process as well as during subsequent charge/discharge cycling. The tin containing electrolyte additive may be used in combination with the manganese additive for the greatest overall dendrite and shape change prevention.

TABLE 4

KOH ELECTROLYTES WITH SOLUBLE TIN ADDITIONS

| ELECTROLYTE TYPE DESIGNATION | COMPOSITION | PERCENT | PERCENT Zn | PERCENT Mn | PERCENT Sn |
|---|---|---|---|---|---|
| S2 | KOH | 30.0 | | | |
| | ZnO$^{(a)}$ | 4.3 | 3.46 | 0 | 0.25 |
| | $K_2SnO_3 \cdot 3H_2O^{(d)}$ | 0.6 | | | |
| S6 | KOH | 30.0 | | | |
| | ZnO | 4.2 | 3.40 | 0 | 0.75 |
| | $K_2SnO_3 \cdot 3H_2O$ | 1.9 | | | |
| S1-D4 | KOH | 30.0 | | | |
| | ZnO | 4.2 | 3.40 | | |
| | $KMnO_4^{(c)}$ | 1.6 | | 0.55 | 0.13 |
| | $K_2SnO_3 \cdot 3H_2O$ | 0.3 | | | |
| S2-D4 | KOH | 30.0 | | | |
| | ZnO | 4.2 | 3.40 | | |
| | $KMnO_4$ | 1.6 | | 0.55 | 0.25 |
| | $K_2SnO_3 \cdot 3H_2O$ | 0.6 | | | |
| S3-D4/2 | KOH | 30.0 | | | |
| | ZnO | 4.2 | 3.40 | | |
| | $KMnO_4$ | 0.8 | | 0.28 | 0.38 |
| | $K_2SnO_3 \cdot 3H_2O$ | 1.0 | | | |
| S3-D4 | KOH | 30.0 | | | |
| | ZnO | 4.2 | 3.40 | | |
| | $KMnO_4$ | 1.6 | | 0.55 | 0.38 |
| | $K_2SnO_3 \cdot 3H_2O$ | 1.0 | | | |
| S3-Z12 | KOH | 30.0 | | | |
| | ZnO | 4.1 | 3.78 | 0.75 | 0.37 |
| | $Zn(MnO_4)_2 \cdot 6H_2O^{(f)}$ | 2.8 | | | |
| | $K_2SnO_3 \cdot 3H_2O$ | 0.9 | | | |
| S6-D4/2 | KOH | 30.0 | | | |
| | ZnO | 4.2 | 3.38 | | |
| | $KMnO_4$ | 0.8 | | 0.27 | 0.75 |
| | $K_2SnO_3 \cdot 3H_2O$ | 1.9 | | | |
| S6-D4 | KOH | 30.0 | | | |
| | ZnO | 4.2 | 3.34 | | |
| | $KMnO_4$ | 1.6 | | 0.54 | 0.75 |
| | $K_2SnO_3 \cdot 3H_2O$ | 1.9 | | | |
| S6-D8 | KOH | 30.0 | | | |
| | ZnO | 5.4 | 4.35 | | |
| | $KMnO_4$ | 1.5 | | 0.54 | 0.74 |
| | $K_2SnO_3 \cdot 3H_2O$ | 1.9 | | | |
| S6-Z12 | KOH | 30.0 | | | |
| | ZnO | 4.1 | 3.74 | 0.74 | 0.74 |
| | $Zn(MnO_4)_2 \cdot 6H_2O$ | 2.8 | | | |
| | $K_2SnO_3 \cdot 3H_2O$ | 1.9 | | | |
| S9-D4/2 | KOH | 30.0 | | | |

TABLE 4-continued

KOH ELECTROLYTES WITH SOLUBLE TIN ADDITIONS

| ELECTROLYTE TYPE DESIGNATION | COMPOSITION | PERCENT | PERCENT Zn | PERCENT Mn | PERCENT Sn |
|---|---|---|---|---|---|
| | ZnO | 4.2 | 3.34 | | |
| | KMnO$_4$ | 0.8 | | 0.27 | 1.11 |
| | K$_2$SnO$_3$ . 3H$_2$O | 2.8 | | | |
| S9-D4 | KOH | 30.0 | | | |
| | ZnO | 4.1 | 3.31 | | |
| | KMnO$_4$ | 1.6 | | 0.54 | 1.11 |
| | K$_2$SnO$_3$ . 3H$_2$O | 2.8 | | | |
| S9-Z12 | KOH | 30.0 | | | |
| | ZnO | 4.1 | 3.71 | 0.73 | 1.09 |
| | Zn(MnO$_4$)$_2$ . 6H$_2$O | 2.8 | | | |
| | K$_2$SnO$_3$ . 3H$_2$O | 2.8 | | | |
| ZS6-D3 | KOH | 30.0 | | | |
| | KMnO$_4$ | 1.6 | 0.42 | 0.57 | 0.76 |
| | ZnSnO$_3$ . 4H$_2$O$^{(e)}$ | 2.0 | | | |
| ZS6-D8 | KOH | 30.0 | | | |
| | ZnO | 5.4 | | | |
| | KMnO$_4$ | 1.5 | 4.75 | 0.53 | 0.72 |
| | ZnSnO$_3$ . 4H$_2$O | 1.9 | | | |
| ZS24-D3 | KOH | 30.0 | | | |
| | KMnO$_4$ | 1.5 | 1.59 | 0.53 | 2.88 |
| | ZnSnO$_2$ . 4H$_2$O | 7.4 | | | |
| ZS30-D3 | KOH | 30.0 | | | |
| | KMnO$_4$ | 1.5 | 1.95 | 0.53 | 3.55 |
| | ZnSnO$_3$ . 4H$_2$O | 9.1 | | | |
| S6ZS6-D8Z10 | KOH | 30.0 | | | |
| | ZnO | 5.3 | | | |
| | Zn(OH)$_2$$^{(b)}$ | 3.0 | | | |
| | KMnO$_4$ | 1.5 | 6.58 | 0.52 | 1.41 |
| | K$_2$SnO$_3$ . 3H$_2$O | 1.8 | | | |
| | ZnSnO$_3$ . 4H$_2$O | 1.8 | | | |
| ZS6-D8Z10 | KOH | 30.0 | | | |
| | ZnO | 5.3 | | | |
| | Zn(OH)$_2$ | 3.0 | | | |
| | KMnO$_4$ | 1.5 | 6.58 | 0.52 | 0.70 |
| | ZnSnO$_3$ . 4H$_2$O | 1.8 | | | |
| S6-D8Z10 | KOH | 30.0 | | | |
| | ZnO | 5.3 | | | |
| | Zn(OH)$_2$ | 3.0 | | | |
| | KMnO$_4$ | 1.5 | 6.19 | 0.52 | 0.71 |
| | K$_2$SnO$_3$ . 3H$_2$O | 1.8 | | | |
| S6ZS6-D8 | KOH | 30.0 | | | |
| | ZnO | 5.2 | | | |
| | KMnO$_4$ | 1.5 | 4.53 | 0.51 | 1.40 |
| | K$_2$SnO$_3$ . 3H$_2$O | 1.8 | | | |
| | ZnSnO$_3$ . 4H$_2$O | 1.8 | | | |

NOTES
$^{(a)}$Zinc oxide, dry process, chemical grade, Certified A.C.S.
$^{(b)}$Zinc hydroxide, chemically precipitated, washed and dried.
$^{(c)}$Potassium permanganate, reagent grade.
$^{(d)}$Potassium stannate, 95%
$^{(e)}$Zinc stannate, chemically precipitated, washed and dried.
$^{(f)}$Zinc permanganate, high purity grade.

The two additives appear to function virtually independently of one another, the tin having only a minor effect on the dendrite prevention, but both helping in regard to the initial shape change phenomena.

Once converted to its metallic form, the tin, unlike the zinc in the anode, should remain in this reduced form on subsequent discharge cycling. Microscopic examination of such anodes after cycling indicate that the tin has become uniformly distributed within the expanded anode structure. This can often be seen as thin metallic flakes of a silvery color. Anodes containing the tin also result in a stronger, more uniform but less expanded anode structure than when processed with similar electrolytes not containing the tin. The improvement noticed in anode shape change with the involvement of the tin may be strictly mechanical in nature, may result from an increase in electrical conductivity within the anode structure, or may be related to the formation of permanent sites for mercury retention as suggested by Kamai and Uchida in U.S. Pat. No. 3,617,384.

Related tin containing compounds, such as sodium stannate, cupric stannate, lead stannate and the like stannate compounds are also expected to be useful.

In testing of cells using the highly electrochemically oxidized anodes of this invention, it has been found to be important to include zincate with the potassium hydroxide electrolyte. This is true whether or not the electrolyte solutions also contain manganese and/or tin additions. While dendrite protection can be afforded with moderate zincate additions, large concentrations have been found to provide excellent dendrite prevention in addition to minimum anode shape change.

When electrochemical oxidation of the special anodes has been attempted without zincate containing electrolytes, a considerable amount of anode distortion and severe surface irregularities have resulted. This is no doubt due to the fact that zincate now can only be supplied to the electrolyte directly from the anode itself. The surface distortion may be due to the rapid transfer of zinc from the anode to the electrolyte but also may be connected with a preferential transfer from certain anode surface areas that have become wet with electrolyte faster than others.

In the electrolyte formulations of Tables 2, 3 and 4, the zincate has normally been added by simply dissolving specified amounts of a chemical grade of zinc oxide (ZnO) in a KOH solution. Zinc hydroxide can also be used as well as other zinc compounds including potassium zincate. The zincate can also be introduced by the electrochemical oxidation of metallic zinc electrodes placed in a potassium hydroxide solution.

Another important variation of this invention involves the inclusion of a selected group of materials in the anode prior to its special electrochemical oxidation step. These anodes additives are all inorganic and are included in the slurry mixture from which the initial anode is made. The specific anode additives that have been found to be of most value are zinc stannate, stannic oxide and finely divided tin metal. Potassium stannate can also be used in small amounts or in combination with the other tin additives such as zinc stannate. It is difficult to use alone, however, because it tends to deflocculate the water based slurry.

As in the case of electrolytes containing tin in solution, the tin incorporated in the anode has been found to minimize initial and longer term shape change phenomena. These anodes are normally used with zincate containing electrolytes that also include the soluble manganese additive for minimizing dendrite formation. The electrolyte may also contain soluble tin.

In addition to the tin anode additive just disclosed, the addition of finely divided lead or copper metal powder was also found to provide a minor but noticeable improvement in overall anode shape change. Examples of anode slurry formulations containing these additives are included in Table 1.

It has been found that anode additives consisting of other stannates such as copper and lead are also of value. It is expected that other stannates will be useful.

The test cells employed in the example of this disclosure are shown schematically in FIGS. 1, 2 and 3. This construction utilizes a single nickel cathode 10 centrally positioned between two zinc anodes 12. Porous nylon separators 14 are placed between the electrodes and also between each anode and the polyethylene envelope 16 that serves as the cell "container".

After the insertion of the electrode separator assembly, the polyethylene envelope is heat sealed across the open end, as at 20. The electrode electrical leads 17 and 18 have been previously coated with a thin layer of tar so that they are also effectively sealed to the envelope at the same time. The electrolyte is then added to the sealed envelope by means of a syringe with a small needle. The needle is inserted through the envelope near the top and the resulting small hole serves as the cell vent during the special electrochemical anode oxidizing step and subsequent cell charge/discharge cycling.

The cathode employed in these experimental test cells were made from larger nickel cathodes removed from unused aircraft-type nickel/cadmium cells. All cathodes came from a specific type battery made by the same manufacturer. The new cathodes were carefully cut to size, the excess nickel oxide coating removed from the tab to expose the nickel current collector and a nickel strip then spot welded to this tab to serve as the electrical lead. Following the cathode preparation, they are carefully cleaned by means of boiling water treatments.

The anodes used in this cell configuration were constructed as half anodes like those that might be used as the outside electrodes of multicell batteries. That is, the zinc coating was applied to one side of the current collector only and is installed so that the coated side of each anode is facing the cathode.

This method was selected as being the most nearly identical to that of a multicell configuration, while at the same time allowing the use of a standard nickel cathode that could be obtained from commercially available batteries.

During the initial anode electrochemical oxidation step and subsequent charge/discharge cycling, the cell is securely held, under pressure, in a multicell holding fixture. This is accomplished by placing the individual cells between synthetic sponge rubber pads and tightening the assembly by means of an adjustable end plate.

The separators, as explained earlier, are of nonwoven material (normally nylon) and measure 3.97 cm by 4.45 cm and are approximately 0.023 cm in thickness. In most of the experimental cells of this disclosure, three separators were used between the electrodes so that the anode-to-cathode separation is approximately 0.075 cm. Two additional separators are placed between the back side of each anode and the polyethylene envelope to assure adequate electrolyte contact and wicking. During assembly, the electrodes are centrally positioned on the flat surface area of the separators. No separator wrapping of the electrodes is involved and no microporous membranes have been included.

The cathode dimensions used in the test cells of this disclosure are approximately 2.7 cm wide by 3.2 cm in length by 0.08 cm thick. These have been cut from the larger nickel cathodes of 10 ampere-hour nickel/cadmium batteries. From tests made with the 10 ampere-hour batteries, and allowing for minor variations between electrodes, it has been determined that these small cathodes have a nominal capacity of 0.25 ampere hours. Since the cathode is the limiting electrode, the overall cell capacity is also in the order of 0.25 ampere hours.

The initial anode dimensions are slightly smaller than those of the cathode and measure approximately 2.6 cm wide by 3.1 cm long by 0.06 cm in thickness; however, this initial anode size may undergo an appreciable expansion during the preliminary electrochemical anode conversion step. The expanded anode may typically measure 3.2 cm by 3.7 cm by as much as 1.5 cm in thickness.

The current collector, aside from its electrical lead, has the same width and height dimensions as the initial anode. Following the anode pasting operation, and allowing to air dry, the excess zinc around the edges of the anode has been removed by sanding flush with the edges of the current collector.

The testing of the experimental nickel/zinc cells referred to in this application has been exclusively carried out using well regulated power supplies. The constant current charging and discharging of the cells has been controlled by timers. In addition, a transistorized circuit has been employed for each cell to cut off the constant current discharge at a pre-set voltage level of 0.9 volts (or almost at complete discharge). In this way, virtually full charge and discharge cycling has been achieved without the need of monitoring to assure that specific cells are not being over or under charged due to shifts in electrode acceptance levels. A complete discharge of each cell is assured by simply using a discharge time that is sufficiently long, at the selected constant current discharge rate, for the most efficient cell being tested to each the 0.9 volt level.

EXAMPLES OF THE INVENTION

Examples of the experimental nickel/zinc cells, using a variety of test configurations, are contained in the following tables of this disclosure. These examples will further serve to illustrate the invention.

Table 6 covers cells using KOH electrolyte, both containing and not containing zincate in solution. Also, included are a number of examples where alkali soluble manganese has been added to such electrolytes.

Table 7 lists test cells run with KOH electrolytes, such as those of Table 6, to which alkali soluble tin compounds have additionally been included.

Each of the cells in these two tables have been initially assembled using anodes containing only zinc dust and mercuric oxide as the active ingredients. This anode fomulation has been designated as type I. The slurry composition for this anode has been previously set forth in Table 1.

Table 8 includes cells in which selected inorganic materials have been included in the anode formulation in addition to the zinc and mercuric oxide. These cells have been tested with a variety of KOH electrolytes, with or without zincate, manganese and tin. Again, the specific slurry formulations for each of the anode types listed in Table 8 can be determined by referring to Table 1.

Each of the cells included in Tables 6, 7 and 8 have undergone the special electrochemical anode oxidation step of this invention prior to the start of the charge/discharge cycling. In each case, this has been accomplished in the fully assembled cell, with the electrolyte present, by simply electrically shorting the electrode terminals with a low resistance connection. A total shorting time of 22 hours has been used for this initial anode oxidation step unless otherwise noted.

Chemical analysis has shown that after the 22 hour shorting of anodes from a cell such as #123-2 in Table 6, about 96% of the anode has been converted to an oxidized form with the remaining about 4% still as metallic zinc.

TABLE 6

TEST CELL EXAMPLES WITH AND WITHOUT ZINCATE AND MANGANESE INCLUDED WITH KOH ELECTROLYTE
[ANODES ELECTROCHEMICALLY OXIDIZED ACCORDING TO METHOD OF THE INVENTION PRIOR TO ELECTRICAL CELL CYCLING]

| Test Cell # | Anode Type (See Table 1) | Major Anode Additives | Percent Additive in Slurry Mix | Anode Weights[a] (grams) | Current Collector Material[b] | Electrolyte Type (See Table 2&3) | Percent KOH | Major Electrolyte Additives | Percent Electrolyte Additive | Separator System[c] | Initial Cathode Condition[d] | Cell Charge Cycle[f] | Cell Discharge Cycle[f] | Discharge Measured at Cycle # | Cell Disassembled Cycle # | Dendrite Penetration Thru Separators Indicated[e] 1 2 3 | Anode Shape Change[g] Notations and Special Remarks |
|---|---|---|---|---|---|---|---|---|---|---|---|---|---|---|---|---|---|
| 64-3 | I | HgO | 2.5 | 1.75 1.70 | Ni | 30K35 | 30 | ZnO | 4.3 | N-2 | D | 6hrs @ 42 ma (0.252Ah) | 1.57hrs 150 ma (0.235Ah) | 32 | 34 | 4 0 0<br>5 0 0 | some shape change |
| 64-4 | I | HgO | 2.5 | 1.75 1.70 | Ni | D-4 | 30 | ZnO KMnO$_4$ | 4.2 1.6 | N-2 | D | 6hrs @ 42 ma (0.252Ah) | 1.62hrs 150 ma (0.243Ah) | 32 | 34 | 0 0 0<br>0 0 0 | very little shape change definitely less than 64-3 |
| 64-1 | I | HgO | 2.5 | 1.75 1.85 | Ni | 30K35 | 30 | ZnO | 4.3 | N-2 | C | 6hrs @ 42 ma (0.252Ah) | 1.6hrs 150 ma (0.240Ah) | 32 | 34 | 2 0 0<br>5 0 0 | some shape change ~ 64-1 |
| 64-2 | I | HgO | 2.5 | 1.75 1.80 | Ni | D-4 | 30 | ZnO KMnO$_4$ | 4.2 1.6 | N-2 | C | 6hrs @ 42 ma (0.252Ah) | 1.6hrs 150 ma (0.240Ah) | 32 | 34 | 0 0 0<br>0 0 0 | very little shape change ~ 64-4 |
| 71-1 | I | HgO | 2.5 | 1.75 1.70 | Ni | 30K35 | 30 | ZnO | 4.3 | N-2 | D | 2hrs @ 100 ma 4hrs @ 12.5 ma (0.250Ah) | 150 ma | 33 | 36 | 10 0 0<br>7 0 0 | some shape change |
| 71-2 | I | HgO | 2.5 | 1.65 1.65 | Ni | D-4 | 30 | ZnO KMnO$_4$ | 4.2 1.6 | N-2 | D | 2hrs @ 100 ma 4hrs @ 12.5 ma (0.250Ah) | 1.52hrs 150 ma (0.228Ah) | 33 | 36 | 0 0 0<br>0 0 0 | very little shape change definitely less than 71-1 |
| 71-3 | I | HgO | 2.5 | 1.75 1.8 | Ni | 30K | 30 | none | — | N-2 | D | 2hrs @ 100 ma 4hrs @ 12.5 ma (0.250Ah) | 1.43 hrs 150 ma (0.215Ah) | 33 | 36 | 7 0 0<br>X 3 0 | anode badly vrinkled and erroded considerable shape change |
| 71-4 | I | HgO | 2.5 | 1.7 1.7 | Ni | D-3 | 30 | KMnO$_4$ | 1.6 | N-2 | D | 2hrs @ 100 ma 4hrs @ 12.5 ma (0.250Ah) | 1.58 hrs 150 ma (0.238Ah) | 33 | 36 | F 5 0<br>X 7 0 | anode badly wrinkled and erroded- considerable shape change, ~ 71-3 |
| 76-1 | I | HgO | 2.5 | 1.7 1.8 | Cu Plated Ni | 30K35 | 30 | ZnO | 4.3 | N-3 | D | 6hrs @ 38.5 ma (0.231Ah) | 1.42 hrs 150 ma (0.213Ah) | 39 | 48 | 0 0 0<br>0 0 0 | some shape change |
| 76-2 | I | HgO | 2.5 | 1.7 1.85 | Cu Plated Ni | D-4 | 30 | ZnO KMNO$_4$ | 4.2 1.6 | N-3 | D | 6hrs @ 38.5 ma (0.218Ah) | 1.45 hrs 150 ma (0.218Ah) | 39 | 48 | 0 0 0<br>0 0 0 | a little less shape change than 76-1 |
| 78-1 | I | HgO | 2.5 | 1.9 | Ni | D-4 | 30 | ZnO | 4.2 | N-3 | D | 6hrs @ | 1.47 hrs | | | 0 0 0 | very little |

TABLE 6-continued
TEST CELL EXAMPLES WITH AND WITHOUT ZINCATE AND MANGANESE INCLUDED WITH KOH ELECTROLYTE
[ANODES ELECTROCHEMICALLY OXIDIZED ACCORDING TO METHOD OF THE INVENTION PRIOR TO ELECTRICAL CELL CYCLING]

| Test Cell # | Anode Type (See Table 1) | Major Anode Additives | Percent Additive in Slurry Mix | Anode Weights[a] (grams) | Current Collector Material[b] | Electrolyte Type (See Table 2&3) | Percent KOH | Major Electrolyte Additives | Percent Electrolyte Additive | Separator System[c] | Initial Cathode Condition[d] | Cell Charge Cycle[f] | Cell Discharge Cycle[f] | Discharge Measured at Cycle # | Cell Disassembled Cycle # | Dendrite Penetration Thru Separators Indicated[e] 1 2 3 | Anode Shape Change[g] Notations and Special Remarks |
|---|---|---|---|---|---|---|---|---|---|---|---|---|---|---|---|---|---|
| 78-2 | I | HgO | 2.5 | 1.8 | Ag over Cu Plated Ni Sn | | | $KMnO_4$ | 1.6 | | | 38.5 ma (0.231Ah) | 150 ma (0.220Ah) | 33 | 41 | 0 0 0 | shape change |
| | | | | 1.8 1.95 | | D-4 | 30 | ZnO $KMnO_4$ | 4.2 1.6 | N-3 | D | 6hrs @ 38.5 ma (0.231Ah) | 1.48 hrs 150 ma (0.222Ah) | 33 | 41 | 0 0 0 | very slightly more shape change than 78-1 |
| 78-3 | I | HgO | 2.5 | 1.85 1.80 | over Cu Plated Ni | D-4 | 30 | ZnO $KMnO_4$ | 4.2 1.6 | N-3 | D | 6hrs @ 38.5 ma (0.231Ah) | 1.48 hrs 150 ma (0.222Ah) | 33 | 41 | 0 0 0 | shape change ~ 78-2 |
| 79-7 | I | HgO | 2.5 | 1.75 1.75 | Cu Plated Ni | D-4/2 | 30 | ZnO $KMnO_4$ | 4.2 0.8 | N-3 | D | 6hrs @ 40 ma (0.240Ah) | 1.56 hrs 150 ma (0.234Ah) | 33 | 36 | 0 0 0 | very little shape change |
| 80-1 | I | HgO | 2.5 | 1.9 1.8 | Ni | 30K35 | 30 | ZnO | 4.3 | N-3 | D | 10 hrs @ 25 ma (0.250Ah) | 1.42hrs 150 ma (0.213Ah) | 30 | 34 | 0 1 0 | a little shape change |
| 80-2 | I | HgO | 2.5 | 1.85 1.9 | Ni | D-4 | 30 | ZnO $KMnO_4$ | 4.2 1.6 | N-3 | D | 10hrs @ 25 ma (0.250Ah) | 1.58 hr 150 ma (0.236Ah) | 30 | 34 | 0 0 0 | very little shape change |
| 80-3 | I | HgO | 2.5 | 1.95 2.05 | Cu Plated Ni | 30K35 | 30 | ZnO | 4.3 | N-3 | D | 10hrs @ 25 ma (0.250Ah) | 1.46hr 150 ma (0.219Ah) | 30 | 34 | 4 0 0 | a little shape change 80-1 |
| 80-4 | I | HgO | 2.5 | 1.90 1.85 | Cu Plated Ni Sn | D-4 | 30 | ZnO $KMnO_4$ | 4.2 1.6 | N-3 | D | 10hrs @ 25 ma (0.250Ah) | 1.51hr 150 ma (0.226Ah) | 30 | 34 | 0 0 0 | very little shape change ~ 80-2 |
| 80-5 | I | HgO | 2.5 | 2.2 2.1 | over Cu Plated Ni Sn | 30K35 | 30 | ZnO | 4.3 | N-3 | D | 10hrs @ 25 ma (0.250Ah) | 1.47 hr 150 ma (0.220Ah) | 30 | 34 | 2 0 0 | a little shape change ~ 80-1 and 80-3 |
| 80-6 | I | HgO | 2.5 | 1.85 1.85 | over Cu Plated Ni | D-4 | 30 | ZnO $KMnO_4$ | 4.2 1.6 | N-3 | D | 10hrs @ 25 ma (0.250Ah) | 1.42 hr 150 ma (0.213Ah) | 30 | 34 | 0 0 0 | very little shape change ~ 80-2 and 80-4 |
| 80-7 | I | HgO | 2.5 | 1.8 1.8 | Cu Plated Ni | D-4/2 | 30 | ZnO $KMnO_4$ | 4.2 0.8 | N-3 | D | 10hrs @ 25 ma (0.250Ah) | 1.55 hr 150 ma (0.233Ah) | 30 | 34 | 0 0 0 | very little shape change 80-4 |
| 80-8 | I | HgO | 2.5 | 1.8 1.85 | Cu Plated Ni | D-4/4 | 30 | ZnO $KMnO_4$ | 4.3 0.4 | N-3 | D | 10hrs @ 25 ma (0.250Ah) | 1.5 hr 150 ma (0.225Ah) | 30 | 34 | 0 0 0 | a little shape change—more than 80-7, a little less than 80-3 |

TABLE 6-continued

TEST CELL EXAMPLES WITH AND WITHOUT ZINCATE AND MANGANESE INCLUDED WITH KOH ELECTROLYTE
[ANODES ELECTROCHEMICALLY OXIDIZED ACCORDING TO METHOD OF THE INVENTION PRIOR TO ELECTRICAL CELL CYCLING]

| Test Cell # | Anode Type (See Table 1) | Major Anode Additives | Percent Additive in Slurry Mix | Anode Weights[a] (grams) | Current Collector Material[b] | Electrolyte Type (See Table 2&3) | Percent KOH | Major Electrolyte Additives | Percent Electrolyte Additive | Separator System[c] | Initial Cathode Condition[d] | Cell Charge Cycle[f] | Cell Discharge Cycle[f] | Discharge Measured at Cycle # | Cell Disassembled Cycle # | Dendrite Penetration Thru Separators Indicated[e] 1 2 3 | Anode Shape Change[g] Notations and Special Remarks |
|---|---|---|---|---|---|---|---|---|---|---|---|---|---|---|---|---|---|
| 92-10 | I | HgO | 2.5 | 1.45 1.5 | Cu Plated Ni | D-4 + excess KMnO4 crystals | 30 | ZnO KMnO4 | 4.3 excess | N-3 | D | 10hrs 2 25 ma (0.250Ah) | 1.45hr 150 ma (0.218Ah) | 32 | 38 | 0 0 0 0 0 0 | very little shape change |
| 103-1 | I | HgO | 2.5 | 1.55 1.55 | Cu Plated Ni | D-2 | 25 | ZnO KMnO4 | 3.0 1.6 | S-3 | D | 10hrs @ 25 ma (0.250Ah) | 1.08 hr 150 ma (0.162Ah) | 25 | 31 | 0 0 0 0 0 0 | very low cell output-typical of low KOH concentrations, almost no shape change |
| 119-5 | I | HgO | 2.5 | 1.55 1.55 | Cu | D8Z10 | 30 | ZnO Zn(OH)2 KMnO4 | 5.4 3.1 1.5 | N-3 | D | 10hrs @ 23 ma (0.230Ah) | 1.48hrs 150 ma (0.223Ah) | 39 | 41 | 0 0 0 0 0 0 | almost no shape change extremely uniform anode |
| 123-1 | I | HgO | 2.5 | 1.45 1.5 | Cu | 30K35 | 30 | ZnO | 4.3 | N-3 | D | 10hrs @ 23 ma (0.230Ah) | 1.43 hrs 150 ma (0.215Ah) | 20 | 34 | 5 0 0 0 0 0 | some shape change |
| 123-2 | I | HgO | 2.5 | 1.45 1.45 | Cu | D-4 | 30 | ZnO KMnO4 | 4.2 1.6 | N-3 | D | 10hrs @ 23 ma (0.230Ah) | 1.47 hrs 150 ma (0.220Ah) | 20 | 34 | 0 0 0 0 0 0 | definitely less shape change than 123-1 |

NOTES
[a]Weight in grams is listed for each of the two anodes in each cell. Weight is for the dried slurry composition but does not include the weight of the current collector.
[b]Current collectors are copper, nickel or electroplated nickel as indicated. All collectors are made of a fine mesh expanded metal, type 7-4/0, manufactured by Exmelt Corporation, Bridgeport, Connecticut.
[c]Separator systme is as shown in Table 5 and accompaning description. N-2 indicates use of a non-woven nylon type 2505-K4 with random fiber orientation and N-3 indicates type 2503-K4 with undirectional fiber orientation Both types are sold under the trade name PELLON and are manufactured by the Pellon Corporation, Lowell, Massachusetts.
[d]Initial cathode condition as installed in the cell is indicated as "C" for fully charged or as "D" for fully discarged.
[e]Separator # 1 is that closest to the anode, # 2 is the centrally located separator and # 3 is the separator facing against the cathode. A number in the separator column indicates that specific number of dendrites as having penetrated to or thru the particular separator. The letter X indicates many dendrites and F indicates a few.
[f]Constant current charging and discharging were employed.
[g]Unless otherwise noted, shape change notations indicate a widening and thickening of the expanded anode material increasing in magnitude from the top toward the bottom. All cells have been run with the anodes in a vertical position.

TABLE 7

TEST CELL EXAMPLES USING TIN COMPOUNDS INCLUDED WITH KOH BASED ELECTROLYTE
[ANODES ELECTROCHEMICALLY OXIDIZED ACCORDING TO METHOD OF THE INVENTION PRIOR TO ELECTRICAL CELL CYCLING]

| Test Cell # | Anode Type (See Table 1) | Major Anode Additives | Percent Additive in Slurry Mix | Anode Weights(a) (grams) | Current Collector Material(b) | Electrolyte Type (See Table 4) | Percent KOH | Major Electrolyte Additives | Percent Electrolyte Additive | Separator System(c) | Initial Cathode Condition(d) | Cell Charge Cycle(f) | Cell Discharge Cycle(f) | Discharge Measured at Cycle # | Cell Disassembled at Cycle # | Dendrite Penetration Thru Separators Indicated(e) 1 2 3 | Anode Shape Change(g) Notations and Special Remarks |
|---|---|---|---|---|---|---|---|---|---|---|---|---|---|---|---|---|---|
| 73-3 | I | HgO | 2.5 | 1.8 1.85 | Ni | S2 | 30 | ZnO K₂SnO₃ | 4.3 0.6 | N-3 | D | 6hrs @ 40 ma (0.240Ah) | 1.52 hrs 150 ma (0.228Ah) | 34 | 36 | F 0 0 3 0 0 | a little shape change |
| 73-4 | I | HgO | 2.5 | 1.9 1.8 | Ni | S2-D4 | 30 | ZnO KMnO₄ K₂SnO₃ | 4.2 1.6 0.6 | N-3 | D | 6hrs @ 40 ma (0.240Ah) | 1.55 hrs 150 ma (0.233Ah) | 34 | 36 | 0 0 0 0 0 0 | very little shape change |
| 95-1 | I | HgO | 2.5 | 1.35 1.3 | Ni | S2 | 30 | ZnO K₂SnO₃ | 4.3 0.6 | N-3 | D | 10hrs @ 23 ma (0.230Ah) | 1.49 hrs 150 ma (0.230Ah) | 25 | 34 | 0 0 0 0 0 0 | alittle shape change |
| 111-1 | I | HgO | 2.5 | 1.4 1.5 | Cu | S6-D4 | 30 | ZnO KMnO₄ K₂SnO₃ | 4.2 1.6 1.9 | N-3 | D | 10hrs @ 23 ma (0.230Ah) | 1.5 hrs 150 ma (0.225Ah) | 24 | 30 | 0 0 0 0 0 0 | very little shape change |
| 111-2 | I | HgO | 2.5 | 1.5 1.55 | Cu | S2-D4 | 30 | ZnO KMnO₄ K₂SnO₃ | 4.2 1.6 0.6 | N-3 | D | 10hrs @ 23 ma (0.230Ah) | 1.42 hrs 150 ma (0.213 Ah) | 24 | 30 | 0 0 0 0 0 0 | very little shape change 111-1 |
| 111-3 | I | HgO | 2.5 | 1.45 1.55 | Cu | S1-D4 | 30 | ZnO KMnO₄ K₂SnO₃ | 4.2 1.6 0.3 | N-3 | D | 10hrs @ 23 ma (0.230Ah) | 1.43 hrs 150 ma (0.214Ah) | 24 | 30 | 0 0 0 0 0 0 | very slightly more shape change than 111-1 and 111-2 |
| 111-4 | I | HgO | 2.5 | 1.5 1.55 | Cu | S2 | 30 | ZnO K₂SnO₃ | 4.3 0.6 | N-3 | D | 10hrs @ 23 ma (0.230Ah) | 1.37 hr 150 ma (0.205Ah) | 24 | 30 | 0 0 0 0 0 0 | definitely more shape change than 111-2 & 111-3 where manganese additive was present in electrolyte |
| 115-4 | I | HgO | 2.5 | 1.60 1.5 | Cu | S3-D4/2 | 30 | ZnO KMnO₄ K₂SnO₃ | 4.2 0.8 1.0 | N-3 | D | 10hrs @ 23 ma (0.230Ah) | 1.48 hrs 150 ma (0.221Ah) | 29 | 31 | 0 0 0 0 0 0 | a little shape change |
| 115-5 | I | HgO | 2.5 | 1.6 1.5 | Cu | S3-D4 | 30 | ZnO KMnO₄ K₂SnO₃ | 4.2 1.6 1.0 | N-3 | D | 10hrs @ 23 ma (0.230Ah) | 1.44 hrs 150 ma (0.216Ah) | 29 | 31 | 0 0 0 0 0 0 | very slightly less shape change than 113-4 |
| 115-6 | I | HgO | 2.5 | 1.6 1.5 | cu | S3-Z12 | 30 | ZnO KMnO₄ K₂SnO₃ | 4.1 2.8 0.9 | N-3 | D | 10hrs @ 23 ma (0.230Ah) | 1.44 hrs 150 ma (0.216Ah) | 29 | 31 | 0 0 0 0 0 0 | shape change 115-5 |
| 116-1 | I | HgO | 2.5 | 1.55 1.55 | Cu | S6-D4/2 | 30 | ZnO KMnO₄ K₂SnO₃ | 4.2 0.8 1.9 | N-3 | D | 10hrs @ 23 ma (0.230Ah) | 1.5 hr 150 ma (0.225Ah) | 27 | 31 | 0 0 0 0 0 0 | a little shape change |
| 116-2 | I | HgO | 2.5 | 1.55 1.55 | cu | S6-D4 | 30 | ZnO KMnO₄ K₂SnO₃ | 4.2 1.6 1.9 | N-3 | D | 10hrs @ 23 ma (0.230Ah) | 1.48 hr 150 ma (0.223Ah) | 27 | 31 | 0 0 0 0 0 0 | overall shape change - 116-1 |
| 116-3 | I | HgO | 2.5 | 1.55 1.55 | Cu | S6-Z12 | 30 | ZnO Zn(MnO₄)₂ K₂SnO₃ | 4.1 2.8 1.9 | N-3 | D | 10hrs @ 23 ma (0.230Ah) | 0.5 hr 150 ma (0.225Ah) | 27 | 31 | 0 0 0 0 0 0 | overall shape change - 116-1 and 116-2 |
| 116-4 | I | HgO | 2.5 | 1.6 1.5 | Cu | S9-D4/2 | 30 | ZnO KMnO₄ K₂SnO₃ | 4.2 0.8 2.8 | N-3 | D | 10hrs @ 23 ma (0.230Ah) | 1.46 hr 150 ma (0.219Ah) | 27 | 31 | 0 0 0 0 0 0 | overall shape change - 116-1 116-2 and 116-3 a few tin flecks visible in all three separators |

TABLE 7-continued

TEST CELL EXAMPLES USING TIN COMPOUNDS INCLUDED WITH KOH BASED ELECTROLYTE
[ANODES ELECTROCHEMICALLY OXIDIZED ACCORDING TO METHOD OF THE INVENTION PRIOR TO ELECTRICAL CELL CYCLING]

| Test Cell # | Anode Type (See Table 1) | Major Anode Additives | Percent Additive in Slurry Mix | Anode Weights[a] (grams) | Current Collector Material[b] | Percent KOH | Electrolyte Type (See Table 4) | Major Electrolyte Additives | Percent Electrolyte Additive | Separator System[c] | Initial Cathode Condition[d] | Cell Charge Cycle[f] | Cell Discharge Cycle[f] | Discharge Measured at Cycle # | Cell Disassembled at Cycle # | Dendrite Penetration Thru Separators Indicated[e] 1 2 3 | Anode Shape Change[g] Notations and Special Remarks |
|---|---|---|---|---|---|---|---|---|---|---|---|---|---|---|---|---|---|
| 116-5 | I | HgO | 2.5 | 1.6 1.5 | Cu | 30 | S9-D4 | ZnO KMnO4 K2SnO3 | 4.1 1.6 2.8 | N-3 | D | 10hrs @ 23 ma (0.230Ah) | 1.49 hr 150 ma (0.224Ah) | 27 | 31 | 0 0 0 0 0 0 | shape change - 116-4 a few tin flecks visible in 1st separator only |
| 116-6 | I | HgO | 2.5 | 1.5 1.6 | Cu | 30 | S9-Z12 | ZnO Zn(MnO4)2 K2SnO3 | 4.1 2.8 2.8 | N-3 | D | 10hrs @ 23 ma (0.230Ah) | 1.46 hr 150 ma (0.219Ah) | 27 | 31 | 0 0 0 0 0 0 | Shape change - 116-4 almost no tin flecks visible in separators |
| 117-4 | I | HgO | 2.5 | 1.5 1.6 | Cu | 30 | S6-D8 | ZnO KMnO4 K2SnO3 | 5.4 1.5 1.9 | N-3 | D | 10hrs @ 23 ma (0.230Ah) | 1.43 hr 150 ma (0.215Ah) | 31 | 33 | 0 0 0 0 0 0 | very little shape change |
| 118-1 | I | HgO | 2.5 | 1.5 1.5 | Cu | 30 | ZS6-D3 | ZnO KMnO4 ZnSnO3 | 1.6 2.0 | N-3 | D | 10hrs @ 23 ma (0.230Ah) | 1.48 hr 150 ma (0.223Ah) | 29 | 31 | 6 0 0 8 0 0 | extremely bad shape change and some holes in anodes |
| 118-2 | I | HgO | 2.5 | 1.5 1.5 | Cu | 30 | ZS30-D3 | KMnO4 ZrSnO3 | 1.5 9.1 | N-3 | D | 10hrs @ 23 ma (0.230Ah) | 1.42 hr 150 ma (0.213Ah) | 29 | 31 | 1 0 0 0 0 0 | anode very irregular in shape and a great many hol in the expanded structure a large number of tin fleck visible in separators |
| 118-5 | I | HgO | 2.5 | 1.5 1.5 | Cu | 30 | ZS6-D8 | ZnO KMnO4 ZnSnO3 | 5.4 1.5 1.9 | N-3 | D | 10hrs @ 23 ma (0.230Ah) | 1.48 hr 150 ma (0.223Ah) | 29 | 31 | 0 0 0 0 0 0 | much less shape change the zincate free 118-1 more shape change than 117-4 with K2SnO3 |
| 119-1 | I | HgO | 2.5 | 1.5 1.55 | Cu | 30 | ZS6-D8Z10 | ZnO Zn(OH)2 KMnO4 ZnSnO3 | 5.3 3.0 1.5 1.8 | N-3 | D | 10 hrs @ 23 ma (0.230Ah) | 1.44hr 150 ma (0.216Ah) | 39 | 41 | 0 0 0 0 0 0 | very little shape change |
| 119-3 | I | HgO | 2.5 | 1.55 1.5 | Cu | 30 | S6-D8Z10 | ZnO Zn(OH)2 KMnO4 K2SnO3 | 5.3 3.0 1.5 1.8 | N-3 | D | 10hrs @ 23 ma (0.230Ah) | 1.46 hr 150 ma (0.220Ah) | 39 | 41 | 0 0 0 0 0 0 | very little shape change - 119-1 |
| 119-4 | I | HgO | 2.5 | 1.5 1.55 | Cu | 30 | S6ZS6-D8 | ZnO KMnO4 K2SnO3 ZnSnO3 | 5.2 1.5 1.8 1.8 | N-3 | D | 10hrs @ 23 ma (0.230Ah) | 1.46 hrs 150 ma (0.220Ah) | 39 | 41 | 0 0 0 0 0 0 | very little shape - 119-1 and 119-2 |
| 123-3 | I | HgO | 2.5 | 1.55 1.4 | Cu | 30 | S-6 | ZnO K2SnO3 | 4.2 1.9 | N-3 | D | 10hrs @ 23 ma (0.230Ah) | 1.41 hrs 150 ma (0.211Ah) | 18 18 | 34 34 | 0 0 0 0 0 0 | a little shape change |
| 123-4 | I | HgO | 2.5 | 1.45 1.55 | Cu | 30 | S6-D4 | ZnO KMnO4 K2SnO3 | 4.2 1.6 1.9 | N-3 | D | 10hrs @ 23 ma (0.230Ah) | 1.41 hrs 150 ma (0.211Ah) | 18 18 | 34 34 | 0 0 0 0 0 0 | very little shape change |

[a]Weight in grams is listed for each of the two anodes in each cell. Weight is for the dried slurry composition but does not include the weight of the current collector.
[b]Current collectors are copper, nickel or electroplated nickel as indicated. All collectors are made of a fine mesh expanded metal, type 7-4/0, manufactured by Exmet Corporation, Bridgeport, Connecticut.
[c]Separator system is as shown in Table 5 and accompanying description. N-2 indicates use of non-woven nylon type 2505-K4 with random fiber orientation and N-3 indicates type 2503-K4 with unidirectional fiber orientation. Both types are sold under the trade name PELLON and are manufactured by the Pellon Corporation, Lowell, Massachusetts.
[d]Initial cathode condition as installed in the cell is indicated as "C" for fully charged or as "D" for fully discharged.
[e]Separator #1 is that closest to the anode, #2 is the centrally located separator and #3 is the separator facing against the cathode. A number in the separator column indicates that specific number of dendrites as having penetrated to or thru the particular separator. The letter X indicates many dendrites and F indicates a few.
[f]Constant current charging and discharging were employed.
[g]Unless otherwise noted, shape change notations indicate a widening and thickening of the expanded anode material increasing in magnitude from the top toward the bottom. All cells have been run with the anodes in a vertical position.

TABLE 8

TEST CELL EXAMPLES USING ANODE FORMULATIONS CONTAINING TIN COMPOUNDS AND OTHER SELECTED ADDITIONS
[ANODES ELECTROCHEMICALLY OXIDIZED ACCORDING TO THE METHOD OF THE INVENTION PRIOR TO ELECTRICAL CELL CYCLING]

| Test Cell # | Anode Type (See Table 1) | Major Anode Additives | Percent Additive in Slurry Mix | Anode Weights(a) (grams) | Current Collector Material(b) | Electrolyte Type (See Table 2&3&4) | Percent KOH | Major Electrolyte Additives | Percent Electrolyte Additive | Separator System(c) | Initial Cathode Condition(d) | Cell Charge Cycle(f) | Cell Discharge Cycle(f) | Discharge Measured at Cycle # | Cell Disassembled at Cycle # | Dendrite Penetration Thru Separators Indicated(e) 1 2 3 | Anode Shape Change(g) Notations and Special Remarks |
|---|---|---|---|---|---|---|---|---|---|---|---|---|---|---|---|---|---|
| 120-3 | EW | HgO ZnSnO3 | 2.5 2.0 | 1.5 1.55 | Cu | D-8Z10 | 30 | ZnO Zn(OH)2 KMnO4 | 5.4 3.1 1.5 | N-3 | D | 10hrs @ 23 ma (0.230Ah) | 1.49 hr 150 ma (0.224Ah) | 37 | 39 | 0 0 0 | no discernable shape change |
| 120-6 | EX | HgO ZnSnO3 | 2.5 3.0 | 1.55 1.55 | Cu | D-8Z10 | 30 | ZnO Zn(OH)2 KMnO4 | 5.4 3.1 1.5 | N-3 | D | 10hrs @ 23 ma (0.230Ah) | 1.42 hr 150 ma (0.213Ah) | 37 | 39 | 0 0 0 | no discernable shape change |
| 121-2 | EW | HgO ZnSnO3 | 2.5 2.0 | 1.5 1.45 | Cu | D-8Z10 | 30 | ZnO Zn(OH)2 KMnO4 | 5.4 3.1 1.5 | N-3 | D | 10hrs @ 23 ma (0.230Ah) | 1.42 hr 150 ma (0.213Ah) | 29 | 39 | 0 0 0 | almost no shape change |
| 121-4 | EW | HgO ZnSnO3 | 2.5 2.0 | 1.5 1.45 | Cu | ZS24-D3 | 30 | KMnO4 ZnSnO3 | 1.5 7.4 | N-3 | D | 10hrs @ 23 ma (0.230Ah) | 1.42 hr 150 ma (0.213Ah) | 29 | 39 | 0 0 0 | considerable shape change and holes in anode structure |
| 121-6 | EW | HgO ZnSnO3 | 2.5 2.0 | 1.55 1.5 | Cu | S6-D8 | 30 | ZnO KMnO4 K2SnO3 | 5.4 1.5 1.9 | N-3 | D | 10hrs @ 23 ma (0.230Ah) | 1.49 hr 150 ma (0.224Ah) | 29 | 39 | 0 0 0 | very little shape change |
| 123-5 | EW | HgO ZnSnO3 | 2.5 2.0 | 1.45 1.4 | Cu | 30K35 | 30 | ZnO | 4.3 | N-3 | D | 10hrs @ 23 ma (0.230Ah) | 1.27 hr 150 ma (0.191Ah) | 18 | 34 | 1 0 0 | a little shape change but also low electrical output |
| 124-3 | FB | HgO K2SnO3 ZnSnO3 | 2.4 1.9 1.9 | 1.5 1.55 | Cu | D-8 | 30 | ZnO KMnO4 | 5.5 1.6 | N-3 | D | 10hrs @ 23 ma (0.230Ah) | 1.48 hr 150 ma (0.221Ah) | 30 | 34 | 0 0 0 |  |
| 110-1 | EF | HgO SnO2 | 2.5 4.0 | 1.55 1.55 | Cu | D-4 | 30 | ZnO KMnO4 | 4.2 1.6 | N-3 | D | 10hrs @ 23 ma (0.230Ah) | 1.51 hr 150ma (0.226Ah) | 26 | 30 | 0 0 0 | a little shape change |
| 110-2 | EG | HgO SnO2 | 2.5 4.0 | 1.55 1.55 | Cu | D-4 | 30 | ZnO KMnO4 | 4.2 1.6 | N-3 | D | 10hrs @ 23 ma (0.230Ah) | 1.43 hr 150 ma (0.213Ah) | 26 | 30 | 0 0 0 | a little less shape change than 110-1 |
| 110-6 | EK | HgO Sn-325 | 2.5 1.0 | 1.55 1.55 | Cu | D-4 | 30 | ZnO KMnO4 | 4.2 1.6 | N-3 | D | 10hrs @ 23 ma (0.230Ah) | 1.44 hrs 150 ma (0.215Ah) | 26 | 30 | 0 0 0 | very little shape change |
| 110-5 | EJ | HgO Sn-325 | 2.5 1.0 | 1.55 1.55 | Cu | D-4 | 30 | ZnO KMnO4 | 4.2 1.6 | N-3 | D | 10hrs @ 23 ma (0.230Ah) | 1.42 hrs 150 ma (0.216Ah) | 26 | 30 | 0 0 0 | very little shape change some tin flecks visible in separators |
| 98-4 | AS | HgO Cu-400 | 2.5 2.0 | 1.45 1.4 | Ni | D-4 | 30 | ZnO KMnO4 | 4.2 1.6 | N-3 | D | 10hrs @ 23 ma (0.230Ah) | 1.48 hrs 150 ma (0.223Ah) | 20 | 30 | 0 0 0 | very little shape change in anode width top to bottom but definitely change in thickness top to bottom |
| 100-1 | BA | HgO Pb-325 | 2.5 2.0 | 1.35 1.4 | Ni | D-4 | 30 | ZnO KMnO4 | 4.2 1.6 | N-3 | D | 10hrs @ 23 ma (0.230Ah) | 1.53 hrs 150 ma (0.226Ah) | 20 | 30 | 0 0 0 | shape change - 98-4 |
| 100-2 | BB | HgO Pb-325 | 2.5 6.0 | 1.45 1.4 | Ni | D-4 | 30 | ZnO KMnO4 | 4.2 1.6 | N-3 | D | 10hrs @ 23 ma (0.230Ah) | 1.52 hrs 150 ma | 20 | 30 | 0 0 0 | shape change - 98-4 |

TABLE 8-continued

TEST CELL EXAMPLES USING ANODE FORMULATIONS CONTAINING TIN COMPOUNDS AND OTHER SELECTED ADDITIONS.
[ANODES ELECTROCHEMICALLY OXIDIZED ACCORDING TO THE METHOD OF THE INVENTION PRIOR TO ELECTRICAL CELL CYCLING]

| Test Cell # | Anode Type (See Table 1) | Major Anode Additives | Percent Additive in Slurry Mix | Anode Weights(a) (grams) | Current Collector Material(b) | Electrolyte Type (See Table 2&3&4) | Percent KOH | Major Electrolyte Additives | Percent Electrolyte Additive | Separator System(c) | Initial Cathode Condition(d) | Cell Charge Cycle(f) | Cell Discharge Cycle(f) | Discharge Measured at Cycle # | Cell Disassembled at Cycle # | Dendrite Penetration Thru Separators Indicated(e) 1 2 3 | Anode Shape Change(g) Notations and Special Remarks |
|---|---|---|---|---|---|---|---|---|---|---|---|---|---|---|---|---|---|
| | | | | | | | | | | | | (0.230Ah) | (0.228Ah) | | | | |

NOTES
(a)Weight in grams is listed for each of the two anodes in each cell. Weight is for the dried slurry composition but does not include the weight of the current collector.
(b)Current collectors are copper, nickel or electroplated nickel as indicated. All collectors are made of a fine mesh expanded metal, type 7-4/0, manufactured by Exmet Corporation, Bridgeport, Connecticut.
(c)Separator system is as shown in Table 5 and accompanying description N-2 indicates use of non-woven nylon type 2505-K4 with unidirectional fiber orientation. Both types are sold under the trade name PELLON and are manufactured by Pellon Corporation, Lowell, Massachusetts.
(d)Initial cathode condition as installed in the cell is indicated as "C" for fully charged or as "C" as fully discharged.
(e)Separator #1 is that closest to the anode, #2 is the centrally located separator and #3 is the separator facing against the cathode. A number in the separator column indicates that specific number of dendrites as having penetrated to or thru the particular separator. The letter X indicates many dendrites and F indicates a few.
(f)Constant current charging and discharging were employed.
(g)Unless otherwise noted, shape change notations indicate a widening and thickening of the expanded anode material increasing in magnitude from the top toward the bottom. All cells have been run with the anodes in a vertical position.

Table 9 shows the dendrite and shape change properties of cells that have been cycled without the initial electrochemical anode oxidation step. In each case, cells shown in Table 9 can be compared with otherwise identically constructed and tested cells in Tables 6, 7 and 8.

The cells referred to in these tables have all been constructed using the double anode-single cathode configuration previously described and shown schematically in FIG. 1. The dimensions of the electrodes, separator system and cell envelope and the cell assembly procedure are the same as indicated in this earlier description. This includes a nominal nickel cathode capacity of 0.250 ampere-hours.

A variety of cell operating conditions have been used. These range from 6-hour to 10-hour charge cycles at different constant current levels. Both single and step charging methods have been shown in the examples.

The anode current densities calculated for the apparent surface area, using the initial anode dimensions, range from 6.2 ma/cm$^2$ to 1.4 ma/cm$^2$ during the charging cycle and 9.3 ma/cm$^2$ during the discharge cycle.

The specific charge and discharge cycle used for each cell example has been listed in the table. Cycling of the cells has been carried out in the manner previously described, including the use of the transistorized circuitry to cut off the discharge of each cell when its voltage has reached the 0.9 volt level. In the case of nickel/zinc cells, as used in these tests, this represents a nearly complete discharge. The total number of charge/discharge cycles given each cell can be found by referring to the column in each table entitled "cell disassembly at cycle#".

Examination for the presence of dendrites has been made during the disassembly of the individual cells.

TABLE 9
COMPARISON TEST CELL EXAMPLES RUN WITHOUT THE INITIAL ELECTROCHEMICAL ANODE OXIDATION PROCESS OF THE INVENTION

| Test Cell # | Anode Type (See Table 1) | Major Anode Additives | Percent Additive in Slurry Mix | Anode Weights(a) (grams) | Current Collector Material(b) | Electrolyte Type (See Table 2&3&4) | Percent KOH | Major Electrolyte Additives | Percent Electrolyte Additive | Separator System(c) | Initial Cathode Condition(a) | Cell Charge Cycle(f) | Cell Discharge Cycle(f) | Discharge Measured at Cycle # | Cell Disassembled at Cycle # | Dendrite Penetration Thru Separators Indicated(e) 1 / 2 / 3 | Anode Shape Change(g) Notations and Special Remarks |
|---|---|---|---|---|---|---|---|---|---|---|---|---|---|---|---|---|---|
| 122-1 | I | HgO | 2.5 | 1.65 / 1.6 | Cu | 30K35 | 30 | ZnO | 4.3 | N-3 | C | 10hrs @ 23 ma (0.230Ah) | 0 hr 150 ma (0 Ah) | 29 | 31 | 1 / 1 / 1  ? / ? / ? | at least 1 large dendrite probably many small dendrites but are now highly oxidized due to shorted cell condition -cell shorted by cycle 15 -large shape change, esp. due to expansion at bottom of anode |
| 122-2 | I | HgO | 2.5 | 1.6 / 1.65 | Cu | D-4 | 30 | ZnO KMnO$_4$ | 4.2 / 1.6 | N-3 | C | 10 hrs @ 23 ma (0.230Ah) | 0 hr 150 ma (0 Ah) | 29 | 31 | X / F / 3  X / F / 1 | large dendrites shorting to cathode -cell shorted by cycle 15 -large shape change mostly due to expansion at bottom of anode |
| 122-3 | I | HgO | 2.5 | 1.65 / 1.6 | Cu | S6 | 30 | ZnO K$_2$SnO$_3$ | 4.2 / 1.9 | N-3 | C | 10 hrs @ 23 ma (0.230Ah) | 0 hr 150 ma (0 Ah) | 29 | 31 | X / X / X  X / ? / ? | 1 large end many small dendrites shorted to cathode -cell shorted by cycle 17 -large shape change mostly due to expansion at bottom of anode |
| 122-4 | I | HgO | 2.5 | 1.65 / 1.6 | Cu | S6-D4 | 30 | ZnO KMnO$_4$ K$_2$SnO$_3$ | 4.2 / 1.6 / 1.9 | N-3 | C | 10 hrs @ 23 ma (0.230Ah) | 1.43 hr 150 ma (0.215Ah) | 29 | 31 | X / X / X  X / X / X | many small dendrites thru all separators but not yet shorting to cathode -extreme shape change incl. large expansion at bottom of anode |
| 122-5 | EW | HgO ZnSnO$_3$ | 2.5 / 2.0 | 1.45 / 1.45 | Cu | 30K35 | 30 | ZnO | 4.3 | N-3 | C | 10hrs @ 23 ma (0.230Ah) | 0 hr 150 ma (0 Ah) | 29 | 31 | X / F / 2  X / 0 / 0 | 2 large dendrites shorted to cathode -¾ cell output by cycle 15 -extreme shape change incl. large expansion at bottom of anode |
| 122-6 | EW | HgO ZnSnO$_3$ | 2.5 / 2.0 | 1.45 / 1.45 | Cu | D-4 | 30 | ZnO KMnO$_4$ | 4.2 / 1.6 | N-3 | C | 10hrs @ 23 ma (0.230Ah) | 1.15 hr 150 ma (0.173Ah) | 29 | 31 | X / X / 1  X / F / ? | -1 large dendrite shorted to cathode -¾ cell output by cycle 17 -extreme shape change including large expansion at bottom of anode |

TABLE 9-continued
COMPARISON TEST CELL EXAMPLES RUN WITHOUT THE INITIAL ELECTROCHEMICAL ANODE OXIDATION PROCESS OF THE INVENTION

| Test Cell # | Anode Type (See Table 1) | Major Anode Additives | Percent Additive in Slurry Mix | Anode Weights(a) (grams) | Current Collector Material(b) | Electrolyte Type (See Table 2&3&4) | Percent KOH | Major Electrolyte Additives | Percent Electrolyte Additive | Separator System(c) | Initial Cathode Condition(d) | Cell Charge Cycle(f) | Cell Discharge Cycle(f) | Discharge Measured at Cycle # | Cell Disassembled at Cycle # | Dendrite Penetration Thru Separators Indicated(e) 1 2 3 | Anode Shape Change(g) Notations and Special Remarks |
|---|---|---|---|---|---|---|---|---|---|---|---|---|---|---|---|---|---| anode

NOTES
(a)Weight in grams is listed for each of the two anodes in each cell. Weight is for the dried slurry composition but does not include the weight of the current collector.
(b)Current collectors are copper, nickel or electroplated nickel as indicated. All collectors are made of a fine mesh expanded metal, type 7-4/0, manufactured by Exmet Corporation, Bridgeport, Connecticut.
(c)Separator system is as shown in Table 5 and accompanying description. N-2 indicates use of non-woven nylon type 2505-K4 with random fiber orientation and N-3 indicates type 2503-K4 with unidirectional fiber orientation. Both types are sold under the trade name PELLON and are manufactured by the Pellon Corporation, Lowell, Massachusetts.
(d)Initial cathode condition as installed in the cell is indicated as "C" for fully charged or as "D" for fully discharged.
(e)Separator #1 is that closest to the anode, #2 is the centrally located separator and #3 is the separator facing against the cathode. A number in the separator column indicates that specific number of dendrites as having penetrated to or thru the particular separator. The letter X indicates many dendrites and F indicates a few.
(f)Constant current charging and discharging were employed.
(g)Unless otherwise noted, shape change notations indicate a widening and thickening of the expanded anode material increasing in magnitude from the top toward the bottom. All cells have been run with the anodes in a vertical position.

For simplification and ease in making comparisons between cells, the tables list dendrite penetration through each of the individual separators. The separator designated (1) is that nearest the anode, (2) is in the middle, and (3) is facing against the cathode. Two sets of dendrite penetration data are included for each cell because of the double anode arrangement. A number appearing in the separator column indicates that this specific number of dendrites has reached or extended beyond the surface of the particular separator. A letter "X" indicates many dendrites and the letter "F" indicates a few dendrites. All examinations for dendrites were made using a microscope so that even the very smallest could be detected and recorded. Significant data concerning anode shape change has also been included in each table.

A variety of anode current collector materials have been employed in these tests. These include nickel and copper as well as tin, silver and copper plated nickel. All of these current collectors were fabricated from a fine mesh expanded metal as explained in more detail in the table notes. No significant advantage of one type over another could be seen in these particular tests.

Referring in more detail to Table 6, it will be noted that the various test cells listed have been assembled with KOH electrolyte, KOH electrolyte with zincate present; and, KOH with zincate plus the addition of an alkaline soluble manganese compound.

Test cell 71-3 employed the basic KOH electrolyte with no zincate present while cells 64-1, 64-3, 71-1, 76-1, 80-1, 80-3, 80-5, and 123-1 contain KOH electrolyte to which zincate has been added. This latter group of cells were found to have, at most, only a few dendrites present after the charge/discharge cycling indicated. When present, these were usually found to have not extended beyond the first separator. On the other hand, cell 71-3, with no zincate present in the initial electrolyte, showed considerably more dendrite growth and separator penetration than the cells containing the zincate. This cell was also found to contain badly erroded and "wrinkled" anode surfaces. This anode distortion problem has been found to occur in all cells that use the special electrochemical anode oxidation step of this invention, when zincate has been omitted from the electrolyte.

It should be noted that cells 64-1 and 64-2 employed charged cathodes and a 10-hour shorting cycle to accomplish the special electrochemical anode oxidizing step. The more normal procedure has been to short the assembled cells for about 22 hours starting with discharged cathodes.

The remaining test cells in Table 6 use KOH electrolyte solutions in which an alkaline soluble manganese compound has been added. As can be noted from an examination of the data, the inclusion of the manganese in the zincate containing KOH electrolytes has effectively eliminated the dendrite penetration into the separator system. Its use has also been found to minimize overall anode shape change effects over those of similar electrolyte formulations that do not contain the manganese additive.

Test cells 79-7 and 80-7 employed half the amount of manganese added to the electrolyte than was used in the majority of the other manganese containing cells of Table 6. Cell 80-8 used one-fourth of this amount. It will be noted that these cells also showed no dendrite growth in the number of charge/discharge cycles run. This indicates that only a very small percentage of the manganese additive is required to limit dendrite growth at the special anodes of this invention.

Test cell 92-10 shows an example of a cell in which a considerable excess of manganese was present in the electrolyte. In this case, finely ground potassium permanganate crystals were placed in the bottom of the cell envelope prior to insertion of the electrode separator system. The idea was to furnish a reservoir that could supply additional soluble manganese to the electrolyte during the operation of the cell. In this instance, the electrolyte used (type D-4) was already at its nominal manganese saturation level with the inclusion of 1.6% potassium permanganate in its composition. The excess potassium permanganate added in powdered form was found to be considerably greater in amount than could be dissolved in the electrolyte during the entire test period. At the conclusion of the test, the electrolyte was found to be still purple in color, indicating that an excess of soluble manganese in the $+7$ valance oxidation state was present. This cell also showed no evidence of dendrite formation in the separator system.

All other cells in Table 6 that were cycled with the more nominal amounts of manganese containing electrolytes, were found to have converted to a reduced manganese form after even a single operating cycle. This was evident by the fact that the electrolyte was no longer purple in color and the presence of the manganese was indicated only by brownish deposits at the anodes, separators and as a precipitate in the electrolyte. These tests show that effective dendrite protection can be achieved with electrolytes in which the amount of soluble manganese can vary from as little as 0.14% (calculated as manganese) to that of a saturated to super saturated manganese content.

Special mention should be made concerning test cell 71-4. This is the only cell in Table 6 that showed dendrite penetration into the separator system and also included alkaline soluble manganese in its electrolyte. This cell, however, is the only one using a manganese containing electrolyte without zincate being present. This cell was included in the table to illustrate the importance of the use of the manganese in combination with the zincate in the electrolyte solution, and to exemplify the discussion of this phenomenon made earlier in this disclosure.

Table 7 shows data obtained with a number of cells operated with electrolytes containing soluble tin. These additives have included potassium and zinc stannate and have been used in electrolytes both with and without zincate and manganese. A wide variation in amounts of the tin additive to the electrolyte have been found useful. As in the preceding table, these cells have utilized the special electrochemically oxidized anodes of this invention.

Cells 118-1 and 118-2 in Table 7 show the effects of using a KOH electrolyte with the soluble tin additive but without the presence of zincate. As in the non-zincate example of the preceding table, these cells showed dendrites along with very irregular anodes with considerable shape change and distortion.

Cells 73-3, 111-4 and 123-4 provide examples in which zincate as well as a soluble tin compound has been included in the electrolyte. As can be seen, the use of both the zincate and the tin has greatly reduced anode shape change effects.

The addition of manganese to these tin/zincate containing electrolytes has provided further improvement in anode shape change as well as a reduction in dendrite growth. Direct comparisons between otherwise identical cells, with and without the manganese electrolyte additive, can be made between cells 73-4 and 73-3, 111-2 and 111-4 or 123-4 and 123-3.

Cells 115-6 and 116-3 in Table 7 utilized zinc permanganate rather than potassium permanganate as the means of incorporating the alkali soluble manganese in these tin containing electrolytes. Zinc permanganate has a higher solubility in the KOH electrolyte than does the potassium counterpart. As a result, a greater manganese content in the electrolyte was present in these cells than in the others shown in this table.

When large amounts of soluble tin have been incorporated in the electrolyte, such as in the case of cells 116-4, 116-5, 116-6 and 118-2 in Table 7, very fine crystalline deposits can be seen in the separator system under microscopic examination. These fine crystalline deposits are mostly concentrated in the separator nearest the anode. Visually they do not appear to be interconnected in any way and no noticeable effect on cell operating conditions has been noted. The presence of larger tin flakes as intersticial anode deposits was also noted in these cells. As described earlier in this disclosure, this is a common condition even when much lower tin concentrations have been used in the electrolyte.

Overall, the tests of Table 7 have shown that the inclusion of tin in the cell electrolyte will provide a reduction in anode shape change. The addition of manganese along with the tin provides still greater shape change reduction. The manganese, however, is still found to be primarily responsible for dendrite prevention. Zincate must be present in either case to prevent serious anode distortion.

Table 8 shows a number of test cell configurations in which selected inorganic additives have been included in the initial anode construction. In this way, the additives were present in the anode structure during their special electrochemical oxidation process.

Anode additions that have been found to be particularly useful for reducing shape change, include zinc stannate, stannic oxide and tin metal. Potassium stannate can also be included in small amounts. The addition of finely divided copper or lead metal powders to the anode mix were also found to provide an improvement in shape change. Examples of cells using anodes of each of these types are included in Table 8.

All but one cell in Table 8 use zincate containing electrolyte with a soluble manganese additive. In addition, a number of these cells also include soluble tin compounds included in the electrolyte. Cell 123-5 contains a KOH electrolyte with zincate only. This is the only cell in the table that showed dendrite growth into the separators.

An overall analysis of the cells in Table 8 shows that selected compounds, especially those containing tin, are helpful in minimizing anode shape change. These anodes when used in combination with zincate containing electrolytes, plus soluble manganese can provide dendrite free anodes with minimal shape change even after repeated cell cycling. Soluble tin may also be included in the cell electrolyte to augment anode additives.

Table 9 includes a total of six cells that have been run for 31 charge/discharge cycles without the use of the preliminary electrochemical anode oxidation step of this invention. These can be compared with similar cells included in preceding Tables 6, 7 and 8 that have used the special pre-oxidation anode processing. As examples, cells 122-1 and 122-2 in Table 9 can be compared with 80-1 and 80-2 in Table 6, 122-3 and 122-4 can be compared with 123-3 and 123-4 in Table 7 and 122-6 with 121-6 in Table 8.

As can be seen from an examination of Table 9, zincate containing KOH electrolytes were employed in each instance; however, examples are included in which soluble manganese, tin or a combination of the two have also been incorporated in the electrolyte. The cells were assembled with charged nickel cathodes since the anodes were already in a reduced form at the start of the cycling process. As in the tests of Tables 6, 7 and 8, only non-woven nylon separators were used between anodes and cathodes. No microporous membranes were included.

Overall operating results for these cells were typical and extremely poor. While all six cells were providing full output at their third discharge cycle, when next checked at 15 cycles, cells 122-1 and 122-2 were found to be dead and 122-5 had about ¾ normal output. By cycle 17, cell 122-3 was found to be dead and 122-6 was now providing about ¾ output. Cell 122-5 had regained almost full output ... undoubtedly due to the oxidation of some previously contacting dendrites. Only cell 122-4 showed full output by the end of the 31 cycle test, although it had given less than full output on a couple of earlier discharge cycles.

Cells 122-1, 122-2 and 122-3 that had obviously shorted early in the cycling, and had remained in this condition, were found on disassembly to have one or two large dendrites. These had penetrated from the anode, grown through all three separators and were found to be firmly making contact against the nickel cathode. Because of the early cell shorting, only a moderate number of dendrites had formed in these cells. On the other hand, cell 122-4 that had retained a more or less normal output through the cycling period, was found to contain extremely large numbers of dendrites. These had penetrated all three separators on both sides of the cathode, had even grown around the edges of the cathode and had bridged across the bottom of the separators from one side to the other. Cells 122-5 and 122-6 also had extremely large numbers of dendrites. All six cells had abnormally large amounts of shape change at the anodes. Cells 122-4, 122-5 and 122-6 had extremely severe shape change.

These test results have essentially repeated many earlier attempts to use conventional zinc anodes without the special pre-oxidation step. They have included anodes made from zinc dust, chemical zinc oxide and combinations of the two.

The negative results of Table 9 exemplify the extreme improvement that can be achieved in the reduction of dendrite growth and shape change through the use of anodes that have been converted from metallic zinc to a highly electrochemically oxidized state prior to the start of normal cell cycling.

Table 9 also points out that the use of soluble manganese and/or tin included in the electrolyte, or tin included in the anode, is of no particular benefit in reducing dendrite and shape change effects unless the specially oxidized anodes of this invention are involved.

The preceding disclosure and examples are intended to illustrate and not to limit this invention. Variations and modifications can be made therein without departing from its intended scope.

What is claimed is:

1. An improved electrical storage battery having a zinc containing anode, a cathode containing a metal oxide selected from the group consisting of nickel oxide, AgO, $Ag_2O$, $MnO_2$, HgO, $PbO_2$ and mixtures thereof and an aqueous alkaline electrolyte containing an inorganic manganese compound additive soluble in said electrolyte.

2. The battery of claim 1 wherein the inorganic additive is selected from the group consisting of manganates and permanganates of potassium and zinc and mixtures thereof.

3. The battery of claim 1 wherein the aqueous alkaline electrolyte contains an amount of a soluble inorganic compound additive adapted to provide a substantial amount of a zincate dissolved in the electrolyte.

4. The battery of claim 3 wherein the zincate is added to the electrolyte in the form selected from the group consisting of zinc oxide and zinc hydroxide.

5. The battery of claim 3 wherein the zinc anode contains an amount of an additive selected from the group consisting of zinc stannate, potassium stannate, stannic oxide, tin metal and mixtures thereof.

6. The battery of claim 3 wherein the zinc anode contains an additive selected from the group consisting of zinc stannate, potassium stannate, stannic oxide, tin, lead or copper metal, sodium stannate, copper stannate and lead stannate.

7. A battery according to claim 3 wherein the zinc containing anode is comprised of finely divided zinc metal which has been at least 95% electrochemically oxidized in situ.

8. A battery according to claim 7 wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode was evidenced by substantial cessation of hydrogen evolution at the cathode.

9. A battery according to claim 3 wherein the zinc containing anode is comprised mainly of finely divided zinc oxide particles formed by electrochemical in situ oxidation of finely divided zinc metal particles supported on a substrate.

10. A battery according to claim 9 wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

11. The battery of claim 1 wherein the zinc anode contains an amount of an additive selected from the group consisting of zinc stannate, potassium stannate, stannic oxide, tin metal and mixtures thereof.

12. The battery of claim 1 wherein the zinc anode contains an additive selected from the group consisting of zinc stannate, potassium stannate, stannic oxide, tin, lead or copper metal, sodium stannate, copper stannate and lead stannate.

13. A battery according to claim 1 wherein the zinc containing anode is comprised of finely divided zinc metal which has been at least 95% electrochemically oxidized in situ.

14. A battery according to claim 13 wherein the battery has been subsequently subjected to a charging current.

15. A battery according to claim 13 wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

16. A battery according to claim 1 wherein the zinc containing anode is comprised mainly of finely divided oxidized zinc particles formed by electrochemical in situ oxidation of finely divided zinc metal particles supported on a substrate.

17. A battery according to claim 16 wherein the zinc metal particles are slurried with water and include a binder and a mercury compound.

18. A battery according to claim 16 wherein the battery has been subsequently subjected to a charging current.

19. A battery according to claim 16 wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

20. An improved electrical storage battery having a zinc containing anode, a cathode containing a metal oxide selected from the group consisting of nickel oxide, AgO, $Ag_2O$, $MnO_2$, HgO, $PbO_2$ and mixtures thereof and an aqueous alkaline electrolyte wherein the zinc containing anode is comprised of finely divided zinc metal which has been at least 95% electrochemically oxidized in situ, wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

21. An improved electrical storage battery having a zinc containing anode, a cathode containing a metal oxide selected from the group consisting of nickel oxide, AgO, $Ag_2O$, $MnO_2$, HgO, $PbO_2$ and mixtures thereof and an aqueous alkaline electrolyte wherein the zinc containing anode is comprised mainly of finely divided oxidized zinc particles formed by electrochemical in situ oxidation of finely divided zinc metal particles supported on a substrate, wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

22. An improved electrical storage battery having a zinc containing anode, a cathode containing a metal oxide selected from the group consisting of nickel oxide, AgO, Ag$_2$O, MnO$_2$, HgO, PbO$_2$ and mixtures thereof and an aqueous alkaline electrolyte wherein the zinc containing anode is comprised mainly of finely divided oxidized zinc particles formed by electrochemical in situ oxidation of finely divided zinc metal particles supported on a substrate and the aqueous alkaline electrolyte contains an amount of an alkali soluble inorganic compound additive adapted to provide a substantial amount of a zincate dissolved in the electrolyte, wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

23. An improved electrical storage battery having a zinc containing anode, a cathode containing a metal oxide selected from the group consisting of nickel oxide, AgO, Ag$_2$O, MnO$_2$, HgO, PbO$_2$ and mixtures thereof and an aqueous alkaline electrolyte wherein the zinc containing anode is comprised mainly of finely divided oxidized zinc particles formed by electrochemical in situ oxidation of finely divided zinc metal particles supported on a substrate and the aqueous alkaline electrolyte contains an amount of an alkali soluble inorganic compound additive adapted to provide a substantial amount of a stannate dissolved in the electrolyte, wherein the finely divided zinc metal is electrochemically oxidized in situ by electrically connecting said anode to the cathode in the electrolyte until the cathode is substantially completely discharged as evidenced by the evolution of hydrogen gas therefrom and maintaining the electrical connection between the anode and cathode for a period of time sufficient to oxidize substantially all of the zinc in the anode as evidenced by substantial cessation of hydrogen evolution at the cathode.

* * * * *